(12) United States Patent
Harada et al.

(10) Patent No.: US 7,504,585 B2
(45) Date of Patent: Mar. 17, 2009

(54) THERMOPLASTIC COMPOSITION, COATED CONDUCTOR, AND METHODS FOR MAKING AND TESTING THE SAME

(75) Inventors: Tamotsu Harada, Tochigi (JP); Vijay Rajamani, Slingerlands, NY (US); Sho Sato, Tochigi-ken (JP); Xiangyang Tai, Tochigi-ken (JP); Weiguang Yao, Tochigi-ken (JP)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/467,599

(22) Filed: Aug. 28, 2006

(65) Prior Publication Data

US 2006/0278425 A1    Dec. 14, 2006

Related U.S. Application Data

(63) Continuation-in-part of application No. 11/381,607, filed on May 4, 2006, now Pat. No. 7,217,886, and a continuation-in-part of application No. 11/256,834, filed on Oct. 24, 2005, now Pat. No. 7,220,917, said application No. 11/381,607 is a continuation of application No. 11/256,833, filed on Oct. 24, 2005, now Pat. No. 7,084,347.

(60) Provisional application No. 60/637,406, filed on Dec. 17, 2004, provisional application No. 60/637,419, filed on Dec. 17, 2004, provisional application No. 60/637,412, filed on Dec. 17, 2004, provisional application No. 60/637,406, filed on Dec. 17, 2004, provisional application No. 60/637,419, filed on Dec. 17, 2004, provisional application No. 60/637,412, filed on Dec. 17, 2004.

(51) Int. Cl.
*H01B 3/30* (2006.01)

(52) U.S. Cl. .................. 174/110 R; 174/36; 174/120 R

(58) Field of Classification Search .................. 174/36, 174/110 R, 110 SR, 110 N, 110 FC, 110 E, 174/120 R, 120 C, 120 AR, 120 SR, 126.1–126
See application file for complete search history.

(56) References Cited

U.S. PATENT DOCUMENTS

| | | | |
|---|---|---|---|
| 4,166,055 A | 8/1979 | Lee | |
| 4,239,673 A | 12/1980 | Lee | |
| 4,383,082 A | 5/1983 | Lee | |
| 4,529,652 A | 7/1985 | Bussink et al. | |
| 4,952,630 A * | 8/1990 | Morgan et al. | 525/72 |
| 5,034,459 A * | 7/1991 | Haaf et al. | 525/68 |

(Continued)

FOREIGN PATENT DOCUMENTS

DE    3917342    11/1990

(Continued)

OTHER PUBLICATIONS

Internation Standard ISO 6722 (Apr. 2002) pp. 20-25.*

(Continued)

*Primary Examiner*—William H Mayo, III
(74) *Attorney, Agent, or Firm*—Cantor Colburn LLP

(57) ABSTRACT

A coated conductor has a conductor and a covering disposed over the conductor. The covering is made, at least in part, from a thermoplastic composition. The thermoplastic composition has a poly(arylene ether); a polyolefin, a block copolymer; and flame retardant.

25 Claims, 1 Drawing Sheet

U.S. PATENT DOCUMENTS

| | | | |
|---|---|---|---|
| 5,166,264 | A | 11/1992 | Lee et al. |
| 5,262,480 | A | 11/1993 | Lee |
| 5,294,655 | A * | 3/1994 | Lee et al. .................. 524/265 |
| 5,364,898 | A | 11/1994 | Lee et al. |
| 5,397,822 | A | 3/1995 | Lee |
| 5,455,292 | A | 10/1995 | Kakegawa et al. |
| 6,045,883 | A | 4/2000 | Akiyama et al. |
| 6,300,417 | B1 | 10/2001 | Sue et al. |
| 6,423,779 | B2 | 7/2002 | Sue et al. |
| 6,495,630 | B2 * | 12/2002 | Adedeji et al. ............... 525/89 |
| 6,610,422 | B1 | 8/2003 | Ooi et al. |
| 7,332,677 | B2 | 6/2006 | Xu et al. |
| 7,084,347 | B2 * | 8/2006 | Mhetar et al. .......... 174/110 R |
| 7,217,885 | B2 | 5/2007 | Mhetar et al. |
| 7,217,886 | B2 * | 5/2007 | Mhetar et al. .......... 174/110 R |
| 7,220,917 | B2 * | 5/2007 | Mhetar et al. .......... 174/110 R |
| 2001/0053820 | A1 * | 12/2001 | Yeager et al. ............... 525/186 |
| 2002/0112875 | A1 * | 8/2002 | Hase et al. ............. 174/120 C |
| 2003/0036602 | A1 * | 2/2003 | Adedeji et al. ............... 525/88 |
| 2003/0096123 | A1 * | 5/2003 | Yeager ...................... 428/461 |
| 2004/0082719 | A1 * | 4/2004 | Adedeji et al. ............... 525/89 |
| 2004/0102551 | A1 * | 5/2004 | Sato et al. .................. 524/115 |
| 2004/0106750 | A1 * | 6/2004 | Yeager et al. ............... 525/502 |
| 2004/0122153 | A1 * | 6/2004 | Guo et al. .................. 524/430 |
| 2004/0171733 | A1 * | 9/2004 | Balfour et al. ............. 524/494 |
| 2004/0214952 | A1 * | 10/2004 | Kannan et al. ............. 525/133 |
| 2006/0134416 | A1 | 6/2006 | Kubo et al. |
| 2006/0135661 | A1 * | 6/2006 | Mhetar et al. ............... 524/127 |
| 2006/0135695 | A1 | 6/2006 | Guo et al. |

FOREIGN PATENT DOCUMENTS

| | | |
|---|---|---|
| EP | 0362660 | 4/1990 |
| EP | 0513972 | 2/1991 |
| EP | 0467113 | 1/1992 |
| EP | 0546841 | 6/1993 |
| EP | 0639620 | 4/1999 |

OTHER PUBLICATIONS

ISO 6722 "Road vehicles-60 V and 600 V single-core cables-Dimensions, test methods and requirements" 34 pages.
ASTM D638-03 "Standard Test Method for Tensile Properties of Plastic" 15 pages.
ASTM D790-03 "Standard Test Methods for Flexural Properties of Unreinforced and Reinforced Plastics and Electrical Insulating Materials" 11 pages.
ASTM D1238 "Standard Test Method for Melt Flow Rates of Thermoplastics by Extrusion Plastometer" 12 pages.
International Search Report for International Application No. PCT/US2005/043048, mailed Mar. 14, 2006.
Japanese Patent No. JP2003-253066, abstract only.
Japanese Patent No. JP 2004091692, abstract only.
Japanese PatentJapanese Patent No. JP 2004106513, abstract only. No. JP 2004106513, abstract only.
Japanese Patent No. JP 2004259683, abstract only.
Japanese Patent No. JP 2004292660, abstract only.
Japanese Patent No. JP 2004315645, abstract only.
Japanese Patent No. JP07-224193, machine translation.
Japanese Patent No. JP11185532, machine translation.
Japanese Patent No. JP 11189690, abstract only.
Japanese Patent No. JP3220231, manual translation.
Japanese Patent No. JP3267146, manual translation.
Japanese Patent No. JP3418209, manual translation.
Japanese Patent No. JP3457042, manual translation.
Japanese Patent No. JP05093107, abstract only.

* cited by examiner

THERMOPLASTIC COMPOSITION, COATED CONDUCTOR, AND METHODS FOR MAKING AND TESTING THE SAME

CROSS REFERENCE TO RELATED APPLICATIONS

This application is a continuation in part of U.S. patent application Ser. No. 11/256,834 filed on Oct. 24, 2005 and U.S. patent application Ser. No. 11/381,607 filed on May 4, 2006. U.S. patent application Ser. No. 11/256,834 issued on May 22, 2007 as U.S. Pat. No. 7,220,917. U.S. patent application Ser. No. 11/381,607 issued on May 15, 2007 as U.S. Pat. No. 7,217,886. U.S. patent application Ser. No. 11/256,834 claims priority to U.S. Provisional Application Serial Nos. 60/637,406, 60/637,419, and 60/637,412 filed on Dec. 17, 2004. U.S. patent application Ser. No. 11/381,607 is a continuation of U.S. patent application Ser. No. 11/256,833, now U.S. Pat. No. 7,084,347 filed on Oct. 24, 2005 which claims priority to U.S. Provisional Application Ser. Nos. 60/637,406, 60/637,419, and 60/637,412 filed on Dec. 17, 2004. U.S. patent application Ser. Nos. 11/256,834 and 11/381,607, U.S. patent application Ser. No. 11/256,833, now U.S. Pat. No. 7,084,347, and U.S. Provisional Application Ser. Nos. 60/637,406, 60/637,419, and 60/637,412 are incorporated in their entirety by reference herein.

BACKGROUND OF INVENTION

Automotive electrical wire located under the hood in the engine compartment has traditionally been insulated with a single layer of high temperature insulation disposed over an uncoated copper conductor. Thermoplastic polyesters, cross-linked polyethylene and halogenated resins such as polyvinyl chloride have long filled the need for the high temperature insulation needed in this challenging environment that requires heat resistance, chemical resistance, flame retardance, and flexibility.

Thermoplastic polyester insulation layers, with outstanding resistance to gas and oil, are mechanically tough and resistant to copper catalyzed degradation but can fail prematurely due to hydrolysis. The insulation layers in thermoplastic polyester insulated electrical wires have also been found to crack when exposed to hot salty water and have failed when subjected to humidity temperature cycling.

There is an increasing desire to reduce or eliminate the use of halogenated resins in coverings. In fact, many countries are beginning to mandate a decrease in the use of halogenated materials. However, as much of the wire coating extrusion equipment was created based upon the specifications of halogenated resins such as polyvinyl chloride, it is desired that replacement materials be capable of being processed in manners similar to polyvinyl chloride.

Cross-linked polyethylene has largely been successful in providing high temperature insulation but this success may be difficult to sustain as the requirements for automotive electrical wire evolve. The amount of wiring in automobiles has increased exponentially, as more electronics are being used in modern vehicles. The dramatic increase in wiring has motivated automobile manufacturers to reduce overall wire diameter by specifying reduced insulation layer thicknesses and specifying smaller conductor sizes. For example, ISO 6722 specifies, for a conductor having a cross sectional area of 2.5 square millimeters, that the thin wall insulation thickness be 0.35 millimeters and the ultra thin wall insulation thickness be 0.25 millimeters.

The reductions in insulation wall thickness pose difficulties when using crosslinked polyethylene. For crosslinked polyethylene the thinner insulation layer thickness results in shorter thermal life, when aged at oven temperatures between 150° C. and 180° C. This limits their thermal rating. For example, an electrical wire having a copper conductor with an adjacent crosslinked polyethylene insulation layer having a 0.75 millimeter wall thickness is flexible and the insulation layer does not crack when bent around a mandrel after being exposed to 150° C. for 3,000 hours. But a similar electrical wire having a crosslinked polyethylene insulation layer with a 0.25 millimeter wall thickness the insulation layer becomes brittle after being exposed to 150° C. for 3,000 hours. The deleterious effects created by these extremely thin wall requirements have been attributed to copper catalyzed degradation, which is widely recognized as a problem in the industry.

It is possible to coat the copper core with, e.g., tin in order to prevent the copper from contacting the crosslinked polyethylene but the additional cost of the coating material and the coating process are expensive. In addition, many automotive specifications require that the copper conductor be uncoated. It is also possible to add stabilizers, also known as metal deactivators, to the insulation material but it is recognized that stabilizers yield only partial protection for electrical wire having thin wall thicknesses.

It has been proposed to employ bilayer or trilayer insulation materials wherein a protective resin based layer is disposed between the crosslinked polyethylene and the copper conductor. However, manufacture of bilayer and trilayer insulation materials is complex, requires increased capital expenditure and the multilayer material presents new issues of inter layer adhesion.

Accordingly, there is an ongoing need for electrical wires having a halogen free covering that are useful in the automotive environment.

BRIEF DESCRIPTION OF THE INVENTION

One embodiment is a thermoplastic composition comprising:
(i) a poly(arylene ether);
(ii) a flame retardant;
(iii) a high density polyethylene; and
(iv) a block copolymer comprising a first block and a second block;
wherein the first block comprises repeating aryl alkylene units and the second block comprises repeating alkylene units; and
wherein the weight ratio of high density polyethylene to poly(arylene ether) is greater than or equal to 0.50. The thermoplastic composition, when disposed over a conductor having a cross section of 2.0 square millimeters to form a covering having a thickness of 400 micrometers, has a long term chemical resistance to gasoline of greater than or equal to 100 days.

One embodiment is a coated conductor comprising:
a conductor; and
a covering disposed over the conductor;
wherein the covering comprises a thermoplastic composition;
wherein the thermoplastic composition comprises
(i) a poly(arylene ether);
(ii) a flame retardant;
(iii) high density polyethylene; and
(iv) a block copolymer comprising a first block and a second block;

wherein the first block comprises repeating aryl alkylene units and the second block comprises repeating alkylene units; and wherein the weight ratio of high density polyethylene to poly(arylene ether) is greater than or equal to 0.50. The coated conductor can have a long term chemical resistance to gasoline of greater than or equal to 100 days.

One embodiment is a method of improving long term chemical resistance to gasoline for a covered conductor comprising:

disposing a covering over a conductor;

wherein the covering comprises a thermoplastic composition;

wherein the thermoplastic composition comprises
(i) a poly(arylene ether);
(ii) a flame retardant;
(iii) high density polyethylene; and
(iv) a block copolymer comprising a first block and a second block;

wherein the first block comprises repeating aryl alkylene units and the second block comprises repeating alkylene units; and wherein the weight ratio of high density polyethylene to poly(arylene ether) is greater than or equal to 0.50.

One embodiment is a thermoplastic composition comprising:

(i) a poly(arylene ether);
(ii) a flame retardant;
(iii) polypropylene, high density polyethylene, or combination thereof; and
(iv) a block copolymer comprising a first block and a second block, wherein the first block comprises repeating aryl alkylene units and the second block comprises repeating alkylene units; and wherein the block copolymer has a weight average molecular weight of greater than or equal to 200,000 grams/mol (g/mol). The thermoplastic composition, when disposed over a conductor having a cross section of 2.0 square millimeters to form a covering having a thickness of 400 micrometers, has a long term chemical resistance to gasoline of greater than or equal to 100 days.

One embodiment is a coated conductor comprising:

a conductor; and a covering disposed over the conductor;

wherein the covering comprises a thermoplastic composition;

wherein the thermoplastic composition comprises
(i) a poly(arylene ether);
(ii) a flame retardant;
(iii) polypropylene, high density polyethylene, or combination thereof; and
(iv) a block copolymer comprising a first block and a second block;

wherein the first block comprises repeating alkylene units and the second block comprises repeating alkylene units;

wherein the block copolymer has a weight average molecular weight of greater than or equal to 200,000 grams/mol (g/mol). The coated conductor can have a long term chemical resistance to gasoline greater than or equal to 100 days.

One embodiment is a method of improving long term chemical resistance to gasoline for a covered conductor comprising:

disposing a covering over a conductor;

wherein the covering comprises a thermoplastic composition;

wherein the thermoplastic composition comprises:
(i) a poly(arylene ether);
(ii) a flame retardant;
(iii) polypropylene, high density polyethylene, or combination thereof; and
(iv) a block copolymer comprising a first block and a second block;

wherein the first block comprises repeating aryl alkylene units and the second block comprises repeating alkylene units; and wherein the block copolymer has a weight average molecular weight of greater than or equal to 200,000 grams/mol (g/mol).

One embodiment is a method of testing for long term chemical resistance to gasoline comprising:

a) testing a coated conductor for chemical resistance according to ISO 6722 using ISO 1817 liquid C;

b) aging the coated conductor at 23° C. and 50% relative humidity with no externally applied stress; and c) inspecting the coated conductor daily for a crack, wherein a) through c) are performed in the order given.

DETAILED DESCRIPTION

Figure 1:
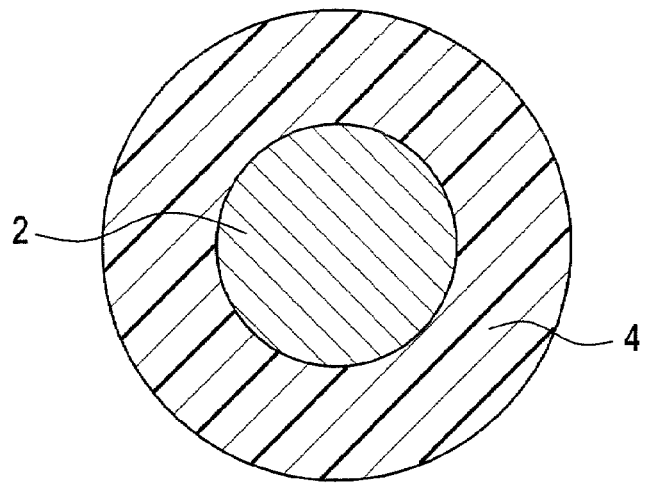
FIG. 1 is a schematic representation of a cross-section of a coated conductor.

In this specification and in the claims, which follow, reference will be made to a number of terms which shall be defined to have the following meanings. The singular forms "a," "an," and "the" include plural referents unless the context clearly dictates otherwise. "Optional" or "optionally" means that the subsequently described event or circumstance may or may not occur, and that the description includes instances where the event occurs and instances where it does not. The terms first, second, (i), (ii), (iii), and the like are used herein merely for descriptive convenience and are not meant denote quantity, ordering or the like unless specifically stated otherwise. The suffix "(s)" as used herein is intended to include both the singular and the plural of the term that it modifies, thereby including one or more of that term (e.g., the element(s) includes one or more elements). The phrase "disposing over a conductor" refers to disposing the thermoplastic composition at least around a circumference of a conductor as shown in the Figures. When a thermoplastic composition has a physical property tested according to ASTM D638-03 or D790-03 the testing is performed as described in the examples. Reference throughout the specification to "one embodiment", "another embodiment", "an embodiment", "some embodiments", and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

ISO 6722, when referred to herein, is the Dec. 15, 2002 version of the standard. ISO 1817, when referred to herein, is the 2005 version of the standard.

Chemical resistance is essential for many coated conductors. For example, coated conductors located in the engine compartment of a vehicle can be exposed to a variety of fluids such as gasoline, oil, transmission fluid, power steering fluid, radiator fluid and the like. When a coated conductor is exposed to these materials it is important that the covering remain intact and continue to function normally. If the covering develops a crack or defect then arcing can occur.

Long term chemical resistance to gasoline is determined by testing the coated conductor for chemical resistance according to ISO 6722 using ISO 1817 liquid C. After completion of chemical resistance testing according to ISO 6722 the test specimen is aged with no externally applied stress at 23° C. and 50% relative humidity. In some embodiments the test specimen is aged in a closed container such as a sealed polyethylene bag. The closed container is stored at 23° C. and 50% relative humidity. The test specimen is checked every day and inspected for cracks as described below. The number of days that the specimen is subjected to aging without cracks is the long term gasoline chemical resistance. For example, if a coated conductor has no cracks after 149 days of aging but has a crack after 150 days of aging then the coated conductor has a long term chemical resistance to gasoline of 149 days.

The specimen can be evaluated for the presence or absence of cracks in the covering by unaided visual inspection, by a withstand voltage test or by a combination of unaided visual inspection and a withstand voltage test. When evaluating a specimen by unaided visual inspection a "crack" is defined as a split, opening or separation in the covering sufficient that the underlying material, e.g., phase paper or conductor, can be seen by unaided visual inspection. The specimen is not intentionally bent during unaided visual inspection. "Unaided visual inspection" is performed by visual observation in the absence of any magnifying device with the exception of corrective lenses necessary for normal eyesight. When evaluating a specimen by the withstand voltage test, then the test is performed according to ISO 6722 section 6.2 with the following modification: the specimen is immersed in salt water (3% sodium chloride (NaCl) by weight in water) for 10 to 60 minutes prior to the application of 1 kilovolt voltage for 1 minute.

The choice of polyolefin, the weight ratio of polyolefin to poly(arylene ether) and the choice of block copolymer can have a significant impact on the long term chemical resistance of the coated conductor. Long term chemical resistance to gasoline can be achieved in two ways. In one approach, a long term chemical resistance to gasoline of greater than or equal to 100 days can be achieved by using appropriate amounts of poly(arylene ether) and high density polyethylene to result in a weight ratio of high density polyethylene to poly(arylene ether) of greater than or equal to 0.50. In another approach, to achieve long term chemical resistance to gasoline of greater than or equal to 100 days the thermoplastic composition can comprise a block copolymer having a weight average molecular weight of greater than or equal to 200,000 g/mol. In some embodiments the thermoplastic composition can comprise a block copolymer having a weight average molecular weight of greater than or equal to 200,000 g/mol and the poly(arylene ether) and high density polyethylene are present in amounts such that the weight ratio of high density polyethylene to poly(arylene ether) is greater than or equal to 0.50.

In some embodiments the coated conductor has a long term chemical resistance to gasoline of greater than or equal to 120 days, or, more specifically, greater than or equal to 140 days, or, even more specifically, greater than or equal to 150 days.

It is important in some embodiments that, in addition to chemical resistance, the coated conductor has sufficient flexibility, strength and durability. The properties of the thermoplastic composition contribute to the properties of the covered conductor. One property of the thermoplastic composition is tensile elongation. In some embodiments, the thermoplastic composition has a tensile elongation at break, as determined by ASTM D638-03 using Type I bars, that is greater than or equal to 30%, or, more specifically, greater than or equal to 40%, or, even more specifically, greater than or equal to 50%. The tensile elongation can be less than or equal to 300%. The bars for tensile elongation are molded as described in the Examples.

Another property of the thermoplastic composition used in the covering is flexibility, as indicated by the flexural modulus. Flexibility is an important property for a covering as the coated conductor must be capable of being bent and manipulated without cracking the covering. A crack in the covering can result in a voltage leak. In addition, several tests included in ISO 6722, the international standard for 60 volts (V) and 600V single core cables in road vehicles, requires that the coated conductor be subjected to a prescribed set of conditions and then wound around a mandrel. After being wound around a mandrel the covering of the coated conductor is examined for cracks and defects. Coated conductors using thermoplastic compositions that are minimally flexible prior to being subjected to conditions such as heat aging or chemical resistance testing frequently have insufficient flexibility, after being subjected to testing conditions, to be wound around a mandrel without cracks developing in the covering.

The thermoplastic composition has a flexural modulus of 600 to 1800 Megapascals (MPa). Experience has taught that flexural modulus values of test samples may vary significantly if different molding conditions are used. All flexural modulus values described herein were obtained using samples molded as described in the Examples and tested according to ASTM D790-03. Within this range the flexural modulus may be greater than or equal to 800 MPa, or, more specifically, greater than or equal to 1000 MPa. Also within this range the flexural modulus may be less than or equal to 1700 MPa, or, more specifically, less than or equal to 1600 MPa.

The thermoplastic composition described herein comprises at least two phases, a polyolefin phase and a poly(arylene ether) phase. The polyolefin phase is a continuous phase. In some embodiments, the poly(arylene ether) phase is dispersed in the polyolefin phase. In some embodiments the poly(arylene ether) is present in an amount by weight greater than the polyolefin and the poly(arylene ether) phase is dispersed in the polyolefin phase. Good compatibilization between the phases can result in improved physical properties including higher impact strength at low temperatures and room temperature, better heat aging, better flame retardance, as well as greater tensile elongation. It is generally accepted that the morphology of the composition is indicative of the degree or quality of compatibilization. Small, relatively uniformly sized particles of poly(arylene ether) evenly distributed throughout an area of the composition are indicative of good compatibilization.

The thermoplastic compositions described herein are essentially free of an alkenyl aromatic resin such as polystyrene or rubber-modified polystyrene (also known as high impact polystyrene or HIPS). Essentially free is defined as containing less than 10 weight percent (wt %), or, more specifically less than 7 wt %, or, more specifically less than 5 wt %, or, even more specifically less than 3 wt % of an alkenyl aromatic resin, based on the combined weight of poly(arylene ether), polyolefin and block copolymer(s). In some embodiments, the composition is completely free of an alkenyl aromatic resin. Surprisingly the presence of the alkenyl aromatic resin can negatively affect the compatibilization between the poly(arylene ether) phase and the polyolefin phase.

As used herein, a "poly(arylene ether)" comprises a plurality of structural units of the formula (I):

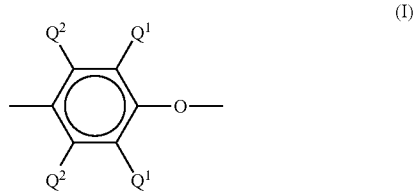

wherein for each structural unit, each $Q^1$ and $Q^2$ is independently hydrogen, halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, aryl and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol, 2,3,6-trimethylphenol and combinations of 2,6-xylenol and 2,3,6-trimethylphenol. Catalyst systems are generally employed for such coupling; they can contain heavy metal compound(s) such as a copper, manganese, or cobalt compound, usually in combination with various other materials such as a secondary amine, tertiary amine, halide, or combination of two or more of the foregoing.

In some embodiments, the poly(arylene ether) comprises a capped poly(arylene ether). The terminal hydroxy groups may be capped with a capping agent via an acylation reaction, for example. In some embodiments the capping agent is chosen to result in a less reactive poly(arylene ether) thereby reducing or preventing cross-linking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. In some embodiments the capping agents are selected from salicylic carbonate and the polysalicylates, especially linear polysalicylates, and combinations comprising one of the foregoing. Exemplary capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkyl-benzamine (salicylamide). The removal of the amino group and the capping provides a poly(arylene ether) that is more stable to high temperatures, thereby resulting in fewer degradative products, such as gels, during processing of the poly (arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of greater than 0.3 deciliters per gram (dl/g), as measured in chloroform at 25° C. Initial intrinsic viscosity is defined as the intrinsic viscosity of the poly (arylene ether) prior to melt mixing with other components of the composition. As understood by one of ordinary skill in the art the viscosity of the poly(arylene ether) may be up to 30% higher after melt mixing. The percentage of increase can be calculated by (final intrinsic viscosity after melt mixing—initial intrinsic viscosity before melt mixing)/initial intrinsic viscosity before melt mixing. Determining an exact ratio, when two initial intrinsic viscosities are used, will depend somewhat on the exact intrinsic viscosities of the poly (arylene ether) used and the ultimate physical properties that are desired.

The poly(arylene ether) used to make the thermoplastic composition can be substantially free of visible particulate impurities. In some embodiments, the poly(arylene ether) is substantially free of particulate impurities greater than 15 micrometers in diameter. As used herein, the term "substantially free of visible particulate impurities" when applied to poly(arylene ether) means that a ten gram sample of a poly (arylene ether) dissolved in fifty milliliters of chloroform ($CHCl_3$) exhibits fewer than 5 visible specks when viewed in a light box with the naked eye. Particles visible to the naked eye are typically those greater than 40 micrometers in diameter. As used herein, the term "substantially free of particulate impurities greater than 15 micrometers" means that of a forty gram sample of poly(arylene ether) dissolved in 400 milliliters of $CHCl_3$, the number of particulates per gram having a size of 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

The composition comprises the poly(arylene ether) in an amount of 35 to 65 weight percent (wt %), based on the total weight of the thermoplastic composition. Within this range the amount of poly(arylene ether) may be greater than or equal to 37 wt %, or, more specifically, greater than or equal to 40 wt %. Also within this range the amount of poly(arylene ether) may be less than or equal to 60 wt %, or, more specifically, less than or equal to 55 wt %.

As described above the thermoplastic composition comprises a polyolefin. In some embodiments the polyolefin is a high density polyethylene. In some embodiments the polyolefin comprises high density polyethylene, polypropylene, or a combination thereof.

The high density polyethylene can be homo polyethylene or a polyethylene copolymer. Additionally the high density polyethylene may comprise a combination of homopolymer and copolymer, a combination of homopolymers having different melting temperatures, and/or a combination of homopolymers having a different melt flow rate. The high density polyethylene can have a density of 0.941 grams per cubic centimeter to 0.965 grams per centimeter.

In some embodiments the high density polyethylene has a melting temperature of greater than or equal to 124° C., or, more specifically, greater than or equal to 126° C., or, even more specifically, greater than or equal to 128° C. In some embodiments, the melting temperature of the high density polyethylene is less than or equal to 140° C.

The high density polyethylene has a melt flow rate (MFR) of 0.29 grams per 10 minutes to 15 grams per ten minutes (g/10 min). Within this range the melt flow rate may be greater than or equal to 0.5 g/10 min. Also within this range the melt flow rate may be less than or equal to 10, or, more specifically, less than or equal to 6, or, more specifically, less than or equal to 5 g/10 min. Melt flow rate can be determined according to ASTM D1238-04c using either powdered or pelletized polyethylene, a load of 2.16 kilograms and a temperature of 190° C.

In some embodiments the weight ratio of high density polyethylene to poly(arylene ether) is greater than or equal to 0.50. In some embodiments the weight ratio of high density polyethylene to poly(arylene ether) is 0.50 to 1.00.

The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, and/or a combination of homopolymers having a different melt flow rates.

In some embodiments the polypropylene comprises a crystalline polypropylene such as isotactic polypropylene. Crystalline polypropylenes are defined as polypropylenes having a crystallinity content of greater than or equal to 20%, or, more specifically, greater than or equal to 25%, or, even more specifically, greater than or equal to 30%. Crystallinity may be determined by differential scanning calorimetry (DSC).

In some embodiments the polypropylene has a melting temperature of greater than or equal to 134° C., or, more specifically, greater than or equal to 140° C., or, even more specifically, greater than or equal to 145° C. In some embodiments, the polypropylene has a melt temperature less than or equal to 175° C.

The polypropylene has a melt flow rate (MFR) of 0.4 grams per 10 minutes to 15 grams per ten minutes (g/10 min). Within this range the melt flow rate may be greater than or equal to 0.6 g/10 min. Also within this range the melt flow rate may be less than or equal to 10, or, more specifically, less than or equal to 6, or, more specifically, less than or equal to 5 g/10 min. Melt flow rate can be determined according to ASTM D1238-04c using either powdered or pelletized polypropylene, a load of 2.16 kilograms and a temperature as 230° C.

In embodiments in which the weight ratio of high density polyethylene to poly(arylene ether) is greater than or equal to 0.50 the amount of high density polyethylene present in the composition is 20 to 40 weight percent (wt %), based on the total weight of the thermoplastic composition. Within this range the amount of high density polyethylene may be greater than or equal to 22 wt %, or, more specifically, greater than or equal to 23 wt %. Also within this range the amount of high density polyethylene may be less than or equal to 37 wt %, or, more specifically, less than or equal to 35 wt %.

In embodiments in which the composition comprises a block copolymer having a weight average molecular weight of greater than or equal to 200,000 g/mol, the polypropylene, high density polyethylene, or combination thereof, may be present in an amount of 24 to 40 wt % based on the total weight of the composition. Within this range the polypropylene, high density polyethylene, or combination thereof may be present in an amount greater than or equal to 25 wt %, or, more specifically, greater than or equal to 26 wt %. Also within this range the amount of polypropylene, high density polyethylene, or combination thereof may be present in an amount less than or equal to 37 wt %, or, more specifically, less than or equal to 35 wt %.

As used herein and throughout the specification "block copolymer" refers to a single block copolymer or a combination of block copolymers. The block copolymer comprises a block (A) comprising repeating aryl alkylene units and a block (B) comprising repeating alkylene units. The arrangement of blocks (A) and (B) may be a linear structure, tapered structure, or a so-called radial teleblock structure having branched chains. A-B-A triblock copolymers have two blocks A comprising repeating aryl alkylene units. A-B diblock copolymers have one block A comprising repeating aryl alkylene units. The pendant aryl moiety of the aryl alkylene units may be monocyclic or polycyclic and may have a substituent at any available position on the cyclic portion. Suitable substituents include alkyl groups having 1 to 4 carbons. An exemplary aryl alkylene unit is phenylethylene, which is shown in formula II:

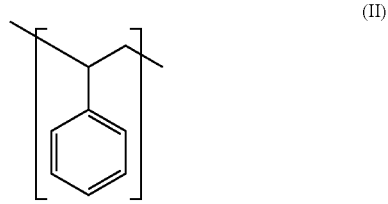

(II)

Block A may further comprise alkylene units having 2 to 15 carbons as long as the quantity of aryl alkylene units exceeds the quantity of alkylene units. Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units. Each occurrence of block A may have a molecular weight which is the same or different than other occurrences of block A. Similarly each occurrence of block B may have a molecular weight which is the same or different than other occurrences of block B. The block copolymer may be functionalized by reaction with an alpha-beta unsaturated carboxylic acid.

In some embodiments, the B block comprises a copolymer of aryl alkylene units and alkylene units having 2 to 15 carbons such as ethylene, propylene, butylene or combinations of two or more of the foregoing. The B block may further comprise some unsaturated carbon-carbon bonds. The B block may be a controlled distribution copolymer. As used herein "controlled distribution" is defined as referring to a molecular structure lacking well-defined blocks of either monomer, with "runs" of any given single monomer attaining a maximum number average of 20 units as shown by either the presence of only a single glass transition temperature (Tg), intermediate between the Tg of either homopolymer, or as shown via proton nuclear magnetic resonance methods. Each A block may have a weight average molecular weight of 3,000 to 60,000 g/mol and each B block may have a weight average molecular weight of 30,000 to 300,000 g/mol. Each B block comprises at least one terminal region adjacent to an A block that is rich in alkylene units and a region not adjacent to the A block that is rich in aryl alkylene units. The total amount of aryl alkylene units is 15 to 75 weight percent, based on the total weight of the block copolymer. The weight ratio of alkylene units to aryl alkylene units in the B block may be 5:1 to 1:2. Exemplary block copolymers are further disclosed in U.S. patent application Ser. No. 2003/181584 and are commercially available from Kraton Polymers under the trademark KRATON. Exemplary grades are A-RP6936 and A-RP6935.

The repeating aryl alkylene units result from the polymerization of aryl alkylene monomers such as styrene. The repeating alkylene units result from the hydrogenation of repeating unsaturated units derived from a diene such as butadiene. The butadiene may comprise 1,4-butadiene and/or 1,2-butadiene. The B block may further comprise some unsaturated non-aromatic carbon-carbon bonds.

Exemplary block copolymers include polyphenylethylene-poly(ethylene/propylene) which is sometimes referred to as polystyrene-poly(ethylene/propylene), polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

In some embodiments the block copolymer is not crosslinked. In some embodiments the composition comprises a cross-linked block copolymer and a non-crosslinked block copolymer. The block copolymer used to form the crosslinked block copolymer is an acid-functionalized block copolymer. The acid-functionalized block copolymer can be prepared from an unfunctionalized block copolymer precursor. The acid-functionalized block copolymer can be prepared by graft-reacting an acid moiety or its derivative onto the block copolymer via a free radically initiated reaction. Suitable monomers that may be grafted include unsaturated mono- and polycarboxylic acids and anhydrides containing from about 3 to about 20 carbon atoms. Examples of such monomers are maleic acid, maleic anhydride, methyl maleic acid, methyl maleic anhydride, dimethyl maleic acid, dimethyl maleic anhydride, monochloro maleic acid, monochloro maleic anhydride, dichloro maleic acid, dichloro maleic anhydride, 5-norbornene-2,3-dicarboxylic acids, 5-norbornene-2,3-dicarboxylic acid anhydrides, tetrahydrophthalic acids, tetrahydrophthalic anhydrides, fumaric acid, itaconic acid, itaconic anhydride, citraconic acid, citraconic anhydride, trimellitic acid, trimellitic acid anhydride, trimellitic anhydride acid chloride, and mixtures thereof. In some embodiments, the grafting monomer is maleic anhydride. The grafted polymer will usually contain about 0.1 to about 10 weight percent of units derived from the grafted monomer, specifically about 0.2 to about 5 weight percent of units derived from the grafted monomer, based on the total weight of the block copolymer.

The grafting reaction can be carried out in solution or by melt-mixing the base block copolymer and the acid/anhydride monomer in the presence of a free radical initiator. Solution processes are described, for example, in U.S. Pat. Nos. 4,033,888 and 4,077,893 to Kiovsky, and U.S. Pat. No. 4,670,173 to Hayashi et al. Melt-mixing processes are described, for example, in U.S. Pat. No. 4,427,828 to Hergenrother et al., U.S. Pat. No. 4,578,429 to Gergen et al., and U.S. Pat. Nos. 4,628,072 and 4,657,971 to Shiraki et al. Suitable acid-functionalized block polymers are also commercially available as, for example, KRATON® FG1901 and KRATON® FG1924 from Kraton Polymers.

In some embodiments, the thermoplastic composition comprises two block copolymers. The first block copolymer has an aryl alkylene content of greater than to equal to 50 weight percent based on the total weight of the first block copolymer. The second block copolymer has an aryl alkylene content of less than 50 weight percent based on the total weight of the second block copolymer. An exemplary combination of block copolymers is a first polyphenylethylene-poly(ethylene/butylene)-polyphenylethylene having a phenylethylene content of 15 weight percent to 45 weight percent, based on the total weight of the block copolymer and a second polyphenylethylene-poly(ethylene/butylene)-polyphenylethylene having a phenylethylene content of 55 weight percent to 70 weight percent, based on the total weight of the block copolymer may be used. Exemplary block copolymers having an aryl alkylene content of greater than 50 weight percent are commercially available from Asahi under the trademark TUFTEC and have grade names such as H1043, as well as some grades available under the tradename SEPTON from Kuraray. Exemplary block copolymers having an aryl alkylene content less than 50 weight percent are commercially available from Kraton Polymers under the trademark KRATON and have grade names such as G-1701, G-1702, G-1730, G-1641, G-1650, G-1651, G-1652, G-1657, A-RP6936 and A-RP6935.

In some embodiments, the thermoplastic composition comprises a diblock copolymer and a triblock copolymer. The weight ratio of the triblock copolymer to the diblock copolymer may be 1:3 to 3:1.

In some embodiments, the block copolymer has a weight average molecular weight of greater than or equal to 200,000 grams per mole (g/mol). Within this range, the weight average molecular weight may be greater than or equal to 210,000 g/mol, or, more specifically, greater than or equal to 220,000 g/mol. The block copolymer can have a weight average molecular weight less than or equal to 350,000 g/mol.

The weight average molecular weight of the block copolymer can be determined using gel permeation chromatography using monodisperse polystyrene standards and samples having a concentration of 1 gram per liter of chloroform. Useful columns include Phenogel™ linear columns. Phenogel™ columns are commercially available from Phenomenex. Exemplary high pressure liquid chromatographs include the 1100 series available from Agilent.

The block copolymer is present in an amount of 7 to 20 weight percent, based on the total weight of the thermoplastic composition. Within this range the block copolymer may be present in an amount greater than or equal to 8, or, more specifically, greater than or equal to 9 weight percent based on the combined weight of the poly(arylene ether), polyolefin, flame retardant and block copolymer. Also within this range the block copolymer may be present in an amount less than or equal to 16, or, more specifically, less than or equal to 15, or, even more specifically, less than or equal to 14 weight percent based on the combined weight of the poly(arylene ether), polyolefin, flame retardant and block copolymer.

When the thermoplastic composition comprises a cross-linked block copolymer the composition may be produced by melt mixing a mixture comprising an acid-functionalized block copolymer as described above and a cross-linking agent. Exemplary cross-linking agents include polyamine compounds and aminosilane compounds. A polyamine compound is a compound that comprises at least three amine groups that may be primary amine groups, secondary amine groups, or a combination thereof. In some embodiments, the polyamine compound may comprise, in addition to the at least three amine groups, alkylene groups that may optionally be substituted with catenary (in-chain) ether oxygen atoms. In some embodiments, the polyamine compound is free of carbonyl groups; in this embodiment, the polyamine is defined to exclude polyamides, polyamideimides, polyimides, and other carbonyl-containing compounds. In some embodiments, the polyamine may comprise greater than or equal to four amine groups, or greater than or equal to five amine groups, or greater than or equal to six amine groups, or greater than or equal to seven amine groups.

In some embodiments, the polyamine compound comprises (a) greater than or equal to three amine groups selected from the group consisting of primary amine groups, secondary amine groups, and combinations thereof, and (b) greater than or equal to one $C_2$-$C_6$ alkylene group optionally substituted with one or more ether oxygen atoms.

In some embodiments, the polyamine compound has a boiling point greater than or equal to 120° C., or, more specifically, greater than or equal to 150° C., or, still more specifically, F or equal to 180° C. Such a boiling point facilitates efficient melt-kneading of the composition by reducing the amount of polyamine compound that is lost via volatilization before reacting with the acid-functionalized block copolymer.

In some embodiments, the polyamine compound is chosen from polyetheramines, polyalkyleneimines, polyalkyleneamines, and mixtures thereof.

In some embodiments, the polyamine compound is a polyetheramine. Polyetheramines are oligomeric or polymeric molecules comprising repeating alkylene ether units and at least two primary amine termini. Suitable polyetheramines include those of formula (III)

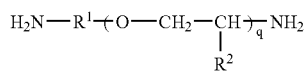

wherein $R^1$ is $C_2$-$C_{12}$ hydrocarbylene, more specifically $C_2$-$C_6$ alkylene, still more specifically —$CH_2CH_2$— or —CH($CH_3$)$CH_2$—; each occurrence of $R^2$ is independently hydrogen or methyl; and q is 1 to 100. Commercially available examples of such polyetheramines include XTJ-505, XTJ-506, XTJ-507, JEFFAMINE® M-2070, JEFFAMINE® D-230, JEFFAMINE® D-400, JEFFAMINE® D-2000, XTJ-500, XTJ-501, XTJ-502, XTJ-510, and JEFFAMINE® EDR-148, all from Huntsman. Suitable polyetheramines further include those of formula (IV)

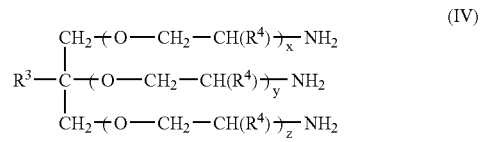

wherein $R^3$ is hydrogen or $C_1$-$C_{12}$ hydrocarbyl, more specifically $C_1$-$C_6$ alkyl; each occurrence of $R^4$ is independently hydrogen or methyl; and x and y and z are each independently 1 to 100. Commercially available examples of such polyetheramines include JEFFAMINE® T-403, JEFFAMINE® T-5000, and XTJ-509, all from Huntsman.

In some embodiments, the polyamine compound is a polyalkyleneimine. Polyalkyleneimines can be prepared by polymerizing an alkylene imine (e.g., ethyleneimine, also known as aziridine) in the presence of a catalyst such as carbon dioxide, sodium bisulfite, sulfuric acid, hydrogen peroxide, hydrochloric acid, acetic acid, or the like. Specific methods for preparing polyalkyleneimines are described, for example, in U.S. Pat. No. 2,182,306 to Ulrich et al., U.S. Pat. No. 3,033,746 to Mayle et al., U.S. Pat. No. 2,208,095 to Esselmann et al., U.S. Pat. No. 2,806,839 to Crowther, and U.S. Pat. No. 2,553,696 to Wilson. In addition to linear and branched polyalkyleneimines, the cyclic amines that are typically formed as by-products of known synthetic methods may also be present. The presence of these materials may be increased or decreased depending on the reaction conditions. Suitable polyalkyleneimines are commercially available as, for example, the polyethyleneimines EPOMIN® SP-003 (about 300 atomic mass units), EPOMIN® SP-006 (about 600 atomic mass units), EPOMIN® SP-012 (about 1200 atomic mass units), EPOMIN® SP-18 (about 1800 atomic mass units), EPOMIN® SP-200 (about 10,000 atomic mass units), EPOMIN® P-1000 (about 70,000 atomic mass units), and EPOMIN® P-1050 (about 70,000 atomic mass units), all from Nippon Shokubai. Commercially available polyalkyleneimines further include the polyethyleneimines LUPASOL FG (about 800 atomic mass units), LUPASOL G20 (about 1,300 atomic mass units), and LUPASOL G35 (about 2,000 atomic mass units), all from BASF.

In some embodiments, the polyamine compound is a polyalkyleneamine. Polyalkyleneamines may be prepared by the reaction of an alkylene dichloride (e.g., ethylene-1,2-dichloride) with ammonia, followed by fractional distillation. Examples of polyalkyleneamines are triethylene tetraamine, tetraethylenepentamine, and tetrabutylenepentamine, as well as the corresponding hexamines, heptamines, octamines, and nonamines. These compounds or mixtures of compounds may further comprise small amounts of reaction by-products, including cyclic amines, particularly piperazines, and cyclic amines with nitrogen-containing side chains. Mixtures of different polyalkyleneamines may be used. Preparation of polyalkyleneamines is described, for example, in U.S. Pat. No. 2,792,372 to Dickson.

In some embodiments, the polyamine compound may have a number average molecular weight of 100 to 1,000,000 atomic mass units. Within this range, the molecular weight may be greater than or equal to 200 atomic mass units, or greater than or equal to 300 atomic mass units. Also within this range, the molecular weight may be less than or equal to 500,000 atomic mass units, or less than or equal to 100,000 atomic mass units, or less than or equal to 10,000 atomic mass units, or less than or equal to 2,000 atomic mass units.

An exemplary aminosilane has the formula (V)

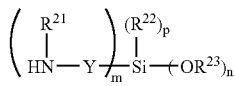

(V)

wherein each occurrence of $R^{21}$ is independently hydrogen, $C_1$-$C_{12}$ hydrocarbyl, or $C_1$-$C_{12}$ hydrocarbylene covalently bound to Y; each occurrence of $R^{22}$ and $R^{23}$ is independently $C_1$-$C_{12}$ hydrocarbyl; each occurrence of Y is independently $C_1$-$C_{12}$ hydrocarbylene or hydrocarbyleneoxy wherein the hydrocarbylene or hydrocarbyleneoxy group may further comprise one or more catenary ether oxygen atoms; m is 1, 2, 3, or 4; n is 0, 1, 2, or 3; and p is 0, 1, 2, or 3; with the proviso that the sum of m and n and p is 4.

The cross-linking agent is present in an amount sufficient to crosslink all or substantially all of the acid-functionalized block copolymer present in the composition. For example, the cross-linking agent may be present in an amount of 0.05 to 0.60 wt % based on the total weight of the composition. Within this range the amount of cross-linking agent may be greater than or equal to 0.10 wt %. Also within this range the amount of cross-linking agent may be less than or equal to 0.50 wt %.

Exemplary flame retardants include melamine (CAS No. 108-78-1), melamine cyanurate (CAS No. 37640-57-6), melamine phosphate (CAS No. 20208-95-1), melamine pyrophosphate (CAS No. 15541-60-3), melamine polyphosphate (CAS# 218768-84-4), melam, melem, melon, zinc borate (CAS No. 1332-07-6), boron phosphate, red phosphorous (CAS No. 7723-14-0), organophosphate esters, monoammonium phosphate (CAS No. 7722-76-1), diammonium phosphate (CAS No. 7783-28-0), alkyl phosphonates (CAS No. 78-38-6 and 78-40-0), metal dialkyl phosphinate, ammonium polyphosphates (CAS No. 68333-79-9), low melting glasses and combinations of two or more of the foregoing flame retardants.

Exemplary organophosphate ester flame retardants include, but are not limited to, phosphate esters comprising phenyl groups, substituted phenyl groups, or a combination of phenyl groups and substituted phenyl groups; bis-aryl phosphate esters based upon resorcinol such as, for example, resorcinol bis-diphenylphosphate, as well as those based upon bis-phenols such as, for example, bis-phenol A bis-diphenylphosphate. In some embodiments, the organophosphate ester is selected from tris(alkylphenyl) phosphate (for example, CAS No. 89492-23-9 or CAS No. 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropylphenyl) phosphate (for example, CAS No. 68937-41-7), and mixtures of two or more of the foregoing organophosphate esters.

In some embodiments the organophosphate ester comprises a bis-aryl phosphate of formula VI:

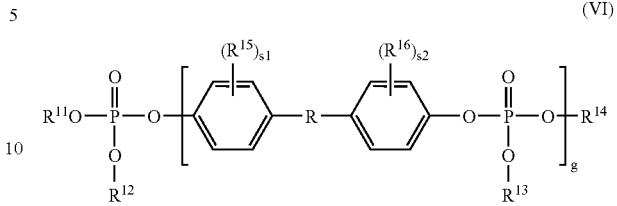

(VI)

wherein R, $R^{15}$ and $R^{16}$ are independently at each occurrence an alkyl group having 1 to 5 carbons and $R^{11}$-$R^{14}$ are independently an alkyl, aryl, arylalkyl or alkylaryl group having 1 to 10 carbons; g is an integer equal to 1 to 25; and s1 and s2 are independently an integer equal to 0 to 2. In some embodiments $OR^{11}$, $OR^{12}$, $OR^{13}$ and $OR^{14}$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

Organophosphate esters can have differing molecular weights making the determination of the amount of different organophosphate esters used in the thermoplastic composition difficult. In some embodiments the amount of phosphorus, as the result of the organophosphate ester, is 0.8 weight percent to 1.2 weight percent with respect to the total weight of the composition.

In some embodiments, the amount of the flame retardant is sufficient for the coated conductor to have an average flame out time of less than or equal to 10 seconds wherein the average flame out time is based on 10 samples. Additionally, no sample should have a flame out time greater than 70 seconds and a minimum of 50 mm of insulation at the top of all the test samples should remain unburned. Flame out time is determined by the flame propagation procedure contained in ISO 6722 for cables with a cross sectional area less than or equal to 2.5 square millimeters using a coated conductor having a conductor with a cross sectional area of 0.2 square millimeters and a covering thickness of 0.2 millimeters.

In some embodiments, the flame retardant is present in an amount of 5 to 18 weight percent, based on the total weight of the thermoplastic composition. Within this range the amount of flame retardant can be greater than or equal to 7, or more specifically, greater than or equal to 8 weight percent. Also within this range the amount of flame retardant can be less than or equal to 16, or, more specifically, less than or equal to 14 weight percent.

In some embodiments the thermoplastic composition may further comprise an ethylene-alpha-olefin elastomeric copolymer. The alpha-olefin component of the copolymer may be a $C_3$-$C_{10}$ alpha-olefin or a combination of $C_3$-$C_{10}$ alpha-olefins. Exemplary alpha-olefins include propylene, 1-butene, and 1-octene. In embodiments comprising high density polyethylene the elastomeric copolymer is a random copolymer having 25 to 95 weight percent ethylene and 75 to 5 weight percent alpha-olefin, based on the total weight of copolymer. Within these ranges, the amount of ethylene can be greater than or equal to 40 weight percent or, more specifically, greater than or equal to 60 weight percent. Also within these ranges, the amount of alpha-olefin may be less than or equal to 90 weight percent; or, more specifically, less than or equal to 85 weight percent, based on the total weight of the copolymer. The ethylene-alpha-olefin elastomeric copolymer may have a melt flow rate of 0.1 to 20 g/10 min. determined according to ASTM D1238 at 2.16 kg and 200° C., and a density of 0.8 to 0.9 g/ml determined according to ASTM D1505 or ASTM D792.

Exemplary ethylene-alpha-olefin elastomeric copolymers include ethylene-propylene elastomeric copolymers, ethylene-butene elastomeric copolymers, ethylene-octene elastomeric copolymers, and mixtures thereof.

The ethylene-alpha-olefin elastomeric copolymer, when present, is used in an amount of 2 to 10 weight percent, based on the total weight of the thermoplastic composition. Within this range, the amount of ethylene-alpha-olefin elastomeric copolymer can be greater than or equal to 3 weight percent. Also within this range the amount of ethylene-alpha-olefin elastomeric copolymer can be less than or equal to 9 weight percent.

Additionally, the thermoplastic composition may optionally also contain various additives, such as antioxidants; fillers and reinforcing agents having an average particle size less than or equal to 10 micrometers, such as, for example, silicates, $TiO_2$, fibers, glass fibers, glass spheres, calcium carbonate, talc, nanoclay, and mica; mold release agents; UV absorbers; stabilizers such as light stabilizers and others; lubricants; plasticizers; pigments; dyes; colorants; anti-static agents; blowing agents; foaming agents; metal deactivators; and combinations comprising one or more of the foregoing additives.

In one embodiment the coated conductor comprises a conductor and a covering disposed over the conductor. The covering comprises a thermoplastic composition. The thermoplastic composition consists essentially of:
  (i) a poly(arylene ether);
  (ii) a flame retardant;
  (iii) 0 to 4 weight percent additive(s);
  (iv) an optional ethylene/alpha-olefin elastomeric copolymer comprising 25 to 95 weight percent ethylene and 75 to 5 weight percent alpha-olefin based on the total weight of the ethylene/alpha-olefin elastomeric copolymer;
  (v) a high density polyethylene; and
  (vi) a block copolymer comprising a first block and a second block.

The first block comprises repeating aryl alkylene units and the second block comprises repeating alkylene units. The weight ratio of high density polyethylene to poly(arylene ether) is greater than or equal to 0.50. The elastomeric copolymer is a random copolymer having 25 to 95 weight percent ethylene based on the total weight of the elastomeric copolymer. The coated conductor has a long term chemical resistance to gasoline of greater than or equal to 100 days.

In one embodiment the coated conductor comprises a conductor and a covering disposed over the conductor. The covering comprises a thermoplastic composition. The thermoplastic composition consists essentially of:
  (i) a poly(arylene ether);
  (ii) a flame retardant;
  (iii) 0 to 4 weight percent additive(s);
  (iv) an optional ethylene/alpha-olefin elastomeric copolymer comprising 25 to 95 weight percent ethylene and 75 to 5 weight percent alpha-olefin based on the total weight of the ethylene/alpha-olefin elastomeric copolymer;
  (v) polypropylene, high density polyethylene, or combination thereof; and
  (vi) a block copolymer comprising a first block and a second block. The first block comprises repeating aryl alkylene units and the second block comprises repeating alkylene units. The block copolymer has a weight average molecular weight of greater than or equal to 200,000 grams/mol (g/mol). The poly(arylene ether) is dispersed in the polypropylene, high density polyethylene, or combination thereof and the amount by weight of poly(arylene ether) is greater than the amount by weight of polypropylene, high density polyethylene, or combination thereof. The coated conductor has a long term chemical resistance to gasoline of greater than or equal to 100 days.

The components of the thermoplastic composition are melt mixed, typically in a melt mixing device such as a compounding extruder or Banbury mixer. In some embodiments, the poly(arylene ether), block copolymer, and polyolefin are simultaneously melt mixed. In some embodiments, the poly(arylene ether), block copolymer, and optionally a portion of the polyolefin are melt mixed to form a first melt mixture. Subsequently, the polyolefin or remainder of the polyolefin is further melt mixed with the first melt mixture to form a second melt mixture. Alternatively, the poly(arylene ether) and a portion of the block copolymer may be melt mixed to form a first melt mixture and then the polyolefin and the remainder of the block copolymer are further melt mixed with the first melt mixture to form a second melt mixture.

The aforementioned melt mixing processes can be achieved without isolating the first melt mixture or can be achieved by isolating the first melt mixture. One or more melt mixing devices including one or more types of melt mixing devices can be used in these processes. In some embodiments, some components of the thermoplastic composition that forms the covering may be introduced and melt mixed in an extruder used to coat the conductor.

When the block copolymer comprises two block copolymers, one having an aryl alkylene content greater than or equal to 50 weight percent and a second one having an aryl alkylene content less than 50 weight percent, the poly(arylene ether) and the block copolymer having an aryl alkylene content greater than or equal to 50 weight percent can be melt mixed to form a first melt mixture and the polyolefin and a block copolymer having an aryl alkylene content less than or equal to 50 weight percent can be compounded with the first melt mixture to form a second melt mixture.

The method and location of the addition of the optional flame retardant is typically dictated by the identity and physical properties, e.g., solid or liquid, of the flame retardant as well understood in the general art of polymer alloys and their manufacture. In some embodiments, the flame retardant is combined with one of the components of the thermoplastic composition, e.g., a portion of the polyolefin, to form a concentrate that is subsequently melt mixed with the remaining components.

The cross-linking agent, when used, may be added with the poly(arylene ether) and block copolymer. In some embodiments, the cross-linking agent is added to the first melt mixture described above, either before the addition of polyolefin or concurrently with the addition of polyolefin. In some embodiments, the cross-linking agent is added to the second melt mixture as described above. In some embodiments the cross-linking agent may be blended with other ingredients prior to melt mixing. In some embodiments the cross-linking agent is part of a masterbatch.

The poly(arylene ether), block copolymer, polyolefin and optional flame retardant are melt mixed at a temperature greater than or equal to the glass transition temperature of the poly(arylene ether) but less than the degradation temperature of the polyolefin. For example, the poly(arylene ether), polymeric compatibilizer, polyolefin and optional flame retardant may be melt mixed at an extruder temperature of 240° C. to 320° C., although brief periods in excess of this range may occur during melt mixing. Within this range, the temperature may be greater than or equal to 250° C., or, more specifically, greater than or equal to 260° C. Also within this range the temperature may be less than or equal to 310° C., or, more specifically, less than or equal to 300° C.

In some embodiments less than or equal to 35 weight percent of the composition, based on the total weight of the composition, may comprise "rework". Rework is defined as material that has been melt mixed before. For example, a composition comprising poly(arylene ether), high density polyethylene and block copolymer may be melt mixed to form a first composition. The first composition is used to make coated conductors but not all of the first composition is used. The unused first composition (the rework) may be then melt mixed with additional poly(arylene ether), high density polyethylene and block copolymer to form a second composition.

After some or all the components are melt mixed, the molten mixture can be melt filtered through one of more filters having openings with diameters of 20 micrometers to 150 micrometers. Within this range, the openings may have diameters less than or equal to 130 micrometers, or, more specifically, less than or equal to 110 micrometers. Also within this range the openings can have diameters greater than or equal to 30 micrometers, or, more specifically, greater than or equal to 40 micrometers. In some embodiments the molten mixture is melt filtered through one or more filters having openings with a maximum diameter that is less than or equal to half of the thickness of the covering on the conductor.

The thermoplastic composition can be formed into pellets, either by strand pelletization or underwater pelletization, cooled, and packaged. In some embodiments the pellets are packaged into moisture barrier containers such as metal foil lined plastic, e.g., polypropylene, bags or metal foil lined paper bags. Substantially all of the air can be evacuated from the pellet filled bags.

In some embodiments, the thermoplastic composition is substantially free of visible particulate impurities. As used herein, the term "substantially free of visible particulate impurities" when applied to the thermoplastic composition means that when the composition is injection molded to form 5 plaques having dimensions of 75 mm×50 mm and having a thickness of 3 mm and the plaques are visually inspected for black specks with the naked eye at a distance of 25 centimeters, the total number of black specks for all five plaques is less than or equal to 100, or, more specifically, less than or equal to 70, or, even more specifically, less than or equal to 50.

In some embodiments the pellets are melted and the composition applied to the conductor by a suitable method such as extrusion coating to form a coated conductor. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments it may be useful to dry the thermoplastic composition before extrusion coating. Exemplary drying conditions are 60-90° C. for 2-20 hours. Additionally, in some embodiments, during extrusion coating, the thermoplastic composition is melt filtered, prior to formation of the coating, through one or more filters having opening diameters of 20 micrometers to 150 micrometers. Within this range, the openings diameters may be greater than or equal to 30 micrometers, or more specifically greater than or equal to 40 micrometers. Also within this range the openings diameters may be less than or equal to 130 micrometers, or, more specifically, less than or equal to 110 micrometers. Alternatively, the one or more filters have openings with a maximum diameter that is less than or equal to half the thickness of the covering on the conductor.

The extruder temperature during extrusion coating is generally less than or equal to 320° C., or, more specifically, less than or equal to 310° C., or, more specifically, less than or equal to 290° C. Additionally the processing temperature is adjusted to provide a sufficiently fluid molten composition to afford a covering for the conductor, for example, higher than the melting point of the thermoplastic composition, or more specifically at least 10° C. higher than the melting point of the thermoplastic composition.

After extrusion coating the coated conductor is usually cooled using a water bath, water spray, air jets or a combination comprising one or more of the foregoing cooling methods. Exemplary water bath temperatures are 20 to 85° C. After cooling the coated conductor is wound onto a spool or like device, typically at a speed of 50 meters per minute (m/min) to 1500 m/min.

In some embodiments, the composition is applied to the conductor to form a covering disposed over the conductor. Additional layers may be applied to the covering.

In some embodiments the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

The conductor may comprise a single strand or a plurality of strands. In some cases, a plurality of strands may be bundled, twisted, or braided to form a conductor. Additionally, the conductor may have various shapes such as round or oblong. Suitable conductors include, but are not limited to, copper wire, aluminum wire, lead wire, and wires of alloys comprising one or more of the foregoing metals. The conductor may also be coated with, e.g., tin or silver.

The cross-sectional area of the conductor and thickness of the covering may vary and is typically determined by the end use of the coated conductor. The coated conductor can be used as electric wire without limitation, including, for example, for harness wire for automobiles, wire for household electrical appliances, wire for electric power, wire for instruments, wire for information communication, wire for electric cars, as well as ships, airplanes, and the like.

Figure 2:
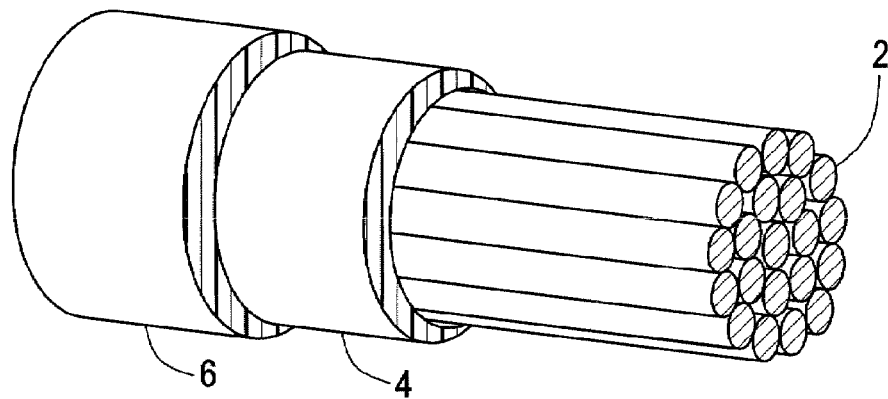
FIGS. 2 and 3 are perspective views of a coated conductor having multiple layers.
Figure 3:
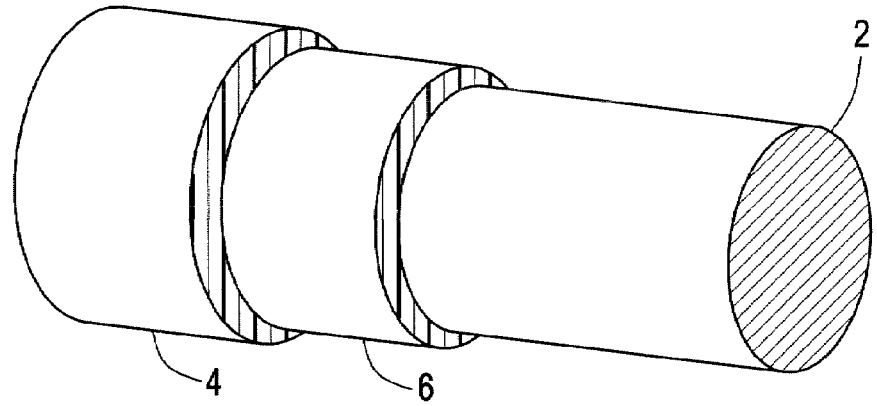

A cross-section of an exemplary coated conductor is seen in FIG. 1. FIG. 1 shows a covering, 4, disposed over a conductor, 2. In some embodiments, the covering, 4, comprises a foamed thermoplastic composition. Perspective views of exemplary coated conductors are shown in FIGS. 2 and 3. FIG. 2 shows a covering, 4, disposed over a conductor, 2, comprising a plurality of strands and an optional additional layer, 6, disposed over the covering, 4, and the conductor, 2.

In some embodiments, the covering, 4, comprises a foamed thermoplastic composition. Conductor, 2, can also comprise a unitary conductor. FIG. 3 shows a covering, 4, disposed over a unitary conductor, 2, and an intervening layer, 6. In some embodiments, the intervening layer, 6, comprises a foamed composition. Conductor, 2, can also comprise a plurality of strands.

A color concentrate or masterbatch may be added to the composition prior to or during the extrusion coating process. When a color concentrate is used it is typically present in an amount less than or equal to 3 weight percent, based on the total weight of the composition. In some embodiments dye and/or pigment employed in the color concentrate is free of chlorine, bromine and fluorine. As appreciated by one of skill in the art, the color of the composition prior to the addition of color concentrate may impact the final color achieved and in some cases it may be advantageous to employ a bleaching agent and/or color stabilization agents. Bleaching agents and color stabilization agents are known in the art and are commercially available.

The compositions and coated conductors are further illustrated by the following non-limiting examples.

EXAMPLES

The following examples were prepared using the materials listed in Table 1.

TABLE 1

| Component | Description |
|---|---|
| PPE | A poly(2,6-dimethylphenylene ether) with an intrinsic viscosity of 0.46 dl/g as measured in chloroform at 25° C. commercially available from GE Plastics under the grade name PPO646. |
| PP | A polypropylene having a melt flow rate of 1.5 g/10 min determined according to ASTM D1238-04c as described above and commercially under the tradename D-015-C from Sunoco Chemicals. |
| HDPE | A high density polyethylene having a melt flow rate of 0.8 g/10 min determined according to ASTM D1238-04c (190° C., 2.16 kilograms) as described above and commercially available from Prime Polymer Co. Ltd. Japan under the tradename HIZEX 5305E. |
| SEBS I | A polyphenylethylene-poly(ethylene/butylene)-polyphenylethylene block copolymer having a phenylethylene content of 31 weight percent, based on the total weight of the block copolymer and a weight average molecular weight of 240,000-301,000 g/mol. This block copolymer is commercially available from KRATON Polymers under the grade name G 1651. |
| SEBS II | A polyphenylethylene-poly(ethylene/butylene)-polyphenylethylene block copolymer having a phenylethylene content of 30 weight percent, based on the total weight of the block copolymer and a weight average molecular weight of 117,000 g/mol. This block copolymer is commercially available from KRATON Polymers under the grade name G 1650. |
| SEBS III | A polyphenylethylene-(co-poly(ethylene/butylene)-polyphenylethylene)-polyphenylethylene block copolymer having a phenylethylene content of 39 weight percent, based on the total weight of the block copolymer and a weight average molecular weight of 175,000 g/mol. This block copolymer is commercially available from KRATON Polymers under the grade name RP6936. |
| SEBS IV | A polyphenylethylene-poly(ethylene/butylene)-polyphenylethylene block copolymer having a phenylethylene content of 67 weight percent, based on the total weight of the block copolymer and a weight average molecular weight of 40,000-56,000 g/mol. This block copolymer is commercially available from Asahi Chemical under the tradename TUFTEC H1043. |
| SEBS V | A polyphenylethylene-poly(ethylene/butylene)-polyphenylethylene block copolymer having a phenylethylene content of 33 weight percent, based on the total weight of the block copolymer and a weight average molecular weight of 288,960 g/mol. The block copolymer comprises functional groups derived from maleic anhydride. This block copolymer is commercially available from KRATON Polymers under the grade name MD6684 CS. |
| TAFMER | An ethylene/alpha-olefin copolymer commercially available from Mitsui Chemicals under the tradename TAFMER A-0585S. TAFMER contains at least 25 weight percent ethylene based on the total weight of the copolymer. |
| VISTAMAXX | Ethylene/propylene copolymer elastomer commercially available from Exxon Mobil Chemical under the grade name VM1100. It contains less than 25 wt % ethylene based on the total weight of the copolymer. |
| EPOMIN SP-006 | A polyethyleneimine having a molecular weight of about 600 mass units and commercially available from Nippon Shokubai. |
| BPADP | Bis-phenol A bis-diphenylphosphate (CAS 181028-79-5) |
| BUDIT 311MPP | Di-melamine pyrophosphate commercially available from Budenhiem Iberica |

Examples 1-9

Examples 1-9 were made by combining the components in a twin screw extruder. The PPE and block copolymer(s) and BUDIT 311 MPP, when present, were added at the feedthroat. The PP or HDPE were added downstream. The organophosphate ester, BPADP, was added by a liquid injector in the second (downstream) half of the extruder. The material was pelletized at the end of the extruder and the pelletized material was injected molded into test specimens for flexural modulus and tensile elongation testing. The compositions are shown in Table 3.

Flexural modulus (FM) was determined using ASTM D790-03 at a pull rate of 2.5 millimeters per minute using bars with a thickness of 6.4 millimeters (127 millimeters×12.7 millimeters×6.4 millimeters). The span to depth ratio was 16:1; a 101 millimeters span was used. Flexural modulus is expressed in Megapascals (MPa). The values given are the average of three samples. Testing was performed at 23° C. and 50% relative humidity.

Tensile elongation (TE) and tensile strength (TS) were determined at break using ASTM D638-03 at a pull rate of 10 millimeters per minute and Type I bars (thickness of 3.2 millimeters). The TE values are expressed in percentage (%). The TS values are expressed in MPa. The values given are the average of 3 samples. Testing was performed at 23° C. and 50% relative humidity.

The samples for flexural modulus and tensile elongation were injection molded using an injection pressure of 600-700 kilograms-force per square centimeter and a hold time of 15 to 20 seconds on a Plastar Ti-80G$_2$ from Toyo Machinery & Metal Co. LTD. The remaining molding conditions are shown in Table 2.

The compositions of the Examples and data are listed in Table 3. Amounts are in weight percent (wt %) based on the total weight of the composition. Example 1 had 0.7 wt % of additives. Examples 2-9 contained 2.0 wt % additives such as antioxidant, stabilizer and metal deactivator.

Coated conductors were produced using the compositions of Examples 1-9. The thermoplastic composition was dried at 80° C. for 3-4 hours prior to extrusion. The thermoplastic composition was extruded with the conductor to form the coated conductor. A 2.0 square millimeter conductor (19 strands×0.36 millimeter) was used. The covering had a thickness of 400 micrometers. The wires were tested for long term chemical resistance to gasoline as described above. Long term chemical resistance to gasoline testing for some samples is ongoing. For those samples in which testing is ongoing the fact that the long term chemical resistance is ongoing (without failure to date) is indicated by ">".

TABLE 2

| | |
|---|---|
| Drying temperature (° C.) | 80 |
| Dry time in hours | 4 |
| Cylinder temperature | |
| 1 | 240 |
| 2 | 250 |
| 3 | 260 |
| 4 | 260 |
| DH | 260 |
| Mold temperature | 80 |

TABLE 3

| | 1* | 2 | 3 | 4 | 5 | 6 | 7* | 8* | 9 |
|---|---|---|---|---|---|---|---|---|---|
| PPE | 46.6 | 49.0 | 46.0 | 47.0 | 43.1 | 43.1 | 49.0 | 51.0 | 43.1 |
| PP | 28.8 | — | — | — | — | — | — | — | — |
| HDPE | — | 28.0 | 31.0 | 25.0 | 26.5 | 23.5 | 23.5 | 16.6 | 26.5 |
| SEBS II | 7.9 | — | 10.0 | — | 7.8 | 7.8 | — | 9.8 | — |
| SEBS III | — | 10.0 | — | 10.0 | — | — | 9.8 | — | 7.8 |
| SEBS IV | 5.0 | — | — | — | 4.9 | 4.9 | — | — | 4.9 |
| TAFMER | — | — | — | 5.0 | 4.9 | 7.8 | 4.9 | 9.8 | 4.9 |
| BPADP | 11.0 | 11.0 | 11.0 | 8.0 | 10.8 | 10.8 | 10.8 | 10.8 | 10.8 |
| BUDIT 311MPP | — | — | — | 3.0 | — | — | — | — | — |
| TS | 40 | 36 | 34 | 32 | 34 | 33 | 35 | 34 | 34 |
| TE | 52 | 55 | 42 | 58 | 91 | 76 | 53 | 37 | 84 |
| FM | 1470 | 1232 | 1341 | 938 | 1398 | 1303 | 1128 | 1274 | 1310 |
| HDPE/PPE | 0.62 | 0.58 | 0.68 | 0.54 | 0.61 | 0.54 | 0.48 | 0.33 | 0.61 |
| Long term chemical resistance to gasoline | 1 | >209 | >209 | >192 | >126 | >126 | 77 | 6 | >126 |

*Comparative Example

Example 1 shows that a composition having weight ratio of polypropylene to poly(arylene ether) of 0.62 and a block copolymer with a weight average molecular weight of less than 200,000 g/mol demonstrates poor long term chemical resistance to gasoline. In contrast, Examples 2 through 6 and Example 9, which contain high density polyethylene instead of polypropylene and a weight ratio of high density polyethylene to poly(arylene ether) greater than or equal to 0.50, demonstrate excellent long term chemical resistance to gasoline. Example 7 has a weight ratio of high density polyethylene to poly(arylene ether) less than 0.50 and has a long term chemical resistance to gasoline that is less than 100 days. This is in marked contrast to Examples 2 and 4 which have comparable formulations in other respects but have a weight ratio of high density polyethylene to poly(arylene ether) greater than or equal to 0.50 and have a long term resistance to gasoline that is greater than 100 days. In Example 8 the weight ratio of high density polyethylene to poly(arylene ether) is even lower than that of Example 7 and the long term chemical resistance to gasoline is lower as well.

Examples 10-16

Examples 10-16 were made and tested as described above with regard to Examples 1-9 with the exception that in the examples containing cross-linked block copolymer the cross-linking agent was added with the PPE. Amounts are in weight percent based on the total weight of the composition. Examples 10-12, 15 and 16 contain 2 wt % of additives similar to the above examples. Examples 13 and 14 contain 0.8 wt % of additives. Compositions and results are shown in Table 4.

TABLE 4

|  | 7* | 10 | 11 | 12 | 13 | 14 | 15* | 16* |
|---|---|---|---|---|---|---|---|---|
| PPE | 49.0 | 49.0 | 49 | 49 | 46.5 | 46.5 | 49.0 | 47.0 |
| PP | — | — | — | — | 28.7 | — | — | — |
| HDPE | 23.5 | 23.5 | 25 | 28 | — | 28.7 | 23.5 | 25.0 |
| SEBS I | — | 9.8 | 8 | 10 | — | — | — | — |
| SEBS II | — | — | — | — | 3.0 | 3.0 | — | 10.0 |
| SEBS III | 9.8 | — | — | — | — | — | 9.8 | — |
| SEBS IV | — | — | — | — | 3.0 | 3.0 | — | — |
| SEBS V | — | — | — | — | 6.9 | 6.9 | — | — |
| TAFMER | 4.9 | 4.9 | 5 | — | — | — | — | — |
| VISTAMAXX | — | — | — | — | — | — | 4.9 | 5.0 |
| EPOMIN SP-0006 | — | — | — | — | 0.2 | 0.2 | — | — |
| BPADP | 10.8 | 10.8 | 11 | 11 | 10.9 | 10.9 | 10.8 | 8.0 |
| BUDIT 311MPP | — | — | — | — | — | — | — | 3.0 |
| TS | 35 | 34 | 36 | 37 | 39 | 32 | 33 | 31 |
| TE | 53 | 11 | 7 | 9 | 29 | 27 | 53 | 46 |
| FM | 1128 | 1480 | 1535 | 1605 | 1720 | 1220 | 995 | 951 |
| HDPE/PPE | 0.48 | 0.48 | 0.52 | 0.58 | — | 0.62 | 0.48 | 0.54 |
| PP/PPE | — | — | — | — | 0.62 | — | — | — |
| Long term chemical resistance to gasoline | 77 | >215 | >215 | >215 | >117 | >117 | 3 | 4 |

*Comparative example

Example 7 has a weight ratio of high density polyethylene to poly(arylene ether) less than 0.50 and comprises a block copolymer having a weight average molecular weight less than 200,000 g/mol. Example 7 has a long term chemical resistance to gasoline that is less than 80 days. In contrast Example 10, which has a similar composition to Example 7 with the exception that the block copolymer has a weight average molecular weight greater than 200,000 g/mol, demonstrates a long term chemical resistance to gasoline that is greater than 215 days. Examples 11 through 14 further show that when the composition comprises a block copolymer having a weight average molecular weight greater than 200,000 g/mol the coated wire achieves a long term chemical resistance to gasoline that is greater than 100 days. In particular Example 13 shows that long term chemical resistance to gasoline can be achieved when polypropylene is the continuous phase and a block copolymer has a weight average molecular weight greater than 200,000 g/mol is used.

Comparative Examples 15 and 16 differ from Examples 10 and 11 primarily in the type of ethylene/alpha-olefin elastomeric copolymer. Examples 15 and 16 which include an ethylene/alpha-olefin elastomeric copolymer that has less than 25 wt % ethylene based on the total weight of the copolymer, have a significantly shorter long term chemical resistance to gasoline.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A coated conductor comprising:
   a conductor; and
   a covering disposed over the conductor;
   wherein the covering comprises a thermoplastic composition;
   wherein the thermoplastic composition comprises
   (i) a poly(arylene ether);
   (ii) a flame retardant;
   (iii) a high density polyethylene; and
   (iv) a block copolymer comprising a first block and a second block;
   wherein the first block comprises repeating aryl alkylene units and the second block comprises repeating alkylene units;
   wherein the composition has a weight ratio of high density polyethylene to poly(arylene ether) of greater than or equal to 0.50; and
   wherein the coated conductor has a long term chemical resistance to gasoline of greater than or equal to 100 days.

2. The coated conductor of claim 1, wherein the thermoplastic composition has a tensile elongation at break that is greater than or equal to 30% as determined by ASTM D638-03 using Type I bars.

3. The coated conductor of claim 1, wherein the thermoplastic composition has a flexural modulus of 600 to 1800 Megapascals as determined by ASTM D790-03.

4. The coated conductor of claim 1, wherein the coated conductor has a long term chemical resistance to gasoline of greater than or equal to 120 days.

5. The coated conductor of claim 1, wherein the coated conductor has a long term chemical resistance to gasoline of greater than or equal to 140 days.

6. The coated conductor of claim 1, wherein the coated conductor has a long term chemical resistance to gasoline of greater than or equal to 150 days.

7. The coated conductor of claim 1, wherein the thermoplastic composition is essentially free of an alkenyl aromatic resin.

8. The coated conductor of claim 1, wherein the weight ratio of high density polyethylene to poly(arylene ether) is 0.50 to 1.00.

9. The coated conductor of claim 1, wherein a portion of the block copolymer is cross-linked.

10. The coated conductor of claim 1, wherein the block copolymer has a weight average molecular weight of 200,000 g/mol to 350,000 g/mol.

11. The coated conductor of claim 1, wherein the thermoplastic composition further comprises an ethylene/alpha-olefin elastomeric copolymer comprising 25 to 95 weight percent ethylene and 75 to 5 weight percent alpha-olefin based on the total weight of the ethylene/alpha-olefin elastomeric copolymer.

12. The coated conductor of claim 11, wherein the ethylene/alpha-olefin elastomeric copolymer is present in an amount of 2 to 10 weight percent based on the total weight of the composition.

13. The coated conductor of claim 12, wherein the polyarylene ether is present in an amount of 40 to 55 weight percent, the high density polyethylene is present in an amount of 20 to 30 weight percent, the block copolymer is present in an amount of 9 to 15 weight percent, the flame retardant is present in an amount of 7 to 12 weight percent, and the weight percents are based on the total weight of the thermoplastic composition.

14. The coated conductor of claim 13, wherein the flame retardant comprises bis-phenol A bis-diphenylphosphate, di-melamine pyrophosphate, or a combination thereof.

15. A coated conductor comprising:
a conductor; and
a covering disposed over the conductor;
wherein the covering comprises a thermoplastic composition;
wherein the thermoplastic composition comprises
   (i) a poly(arylene ether);
   (ii) a flame retardant;
   (iii) a polypropylene, a high density polyethylene, or a combination thereof; and
   (iv) a block copolymer comprising a first block and a second block;
   wherein the first block comprises repeating aryl alkylene units and the second block comprises repeating alkylene units;
   wherein the block copolymer has a weight average molecular weight of greater than or equal to 200,000 grams/mol (g/mol); and
wherein the coated conductor has a long term chemical resistance to gasoline of greater than or equal to 100 days.

16. The coated conductor of claim 15, wherein the poly(arylene ether) is dispersed in the polypropylene, high density polyethylene, or combination thereof and the amount of poly(arylene ether) by weight is greater than the amount by weight of the polypropylene, high density polyethylene, or combination thereof.

17. A thermoplastic composition comprising:
(i) a poly(arylene ether);
(ii) a flame retardant;
(iii) a high density polyethylene; and
(iv) a block copolymer comprising a first block and a second block;
wherein the first block comprises repeating aryl alkylene units and the second block comprises repeating alkylene units;
wherein the composition has a weight ratio of high density polyethylene to poly(arylene ether) of greater than or equal to 0.50; and
wherein the thermoplastic composition, when disposed over a conductor having a cross section of 2.0 square millimeters to form a covering having a thickness of 400 micrometers, has a long term chemical resistance to gasoline of greater than or equal to 100 days.

18. A thermoplastic composition comprising:
(i) a poly(arylene ether);
(ii) a flame retardant;
(iii) polypropylene, high density polyethylene, or combination thereof; and
(iv) a block copolymer comprising a first block and a second block;
wherein the first block comprises repeating aryl alkylene units and the second block comprises repeating alkylene units;
wherein the block copolymer has a weight average molecular weight of greater than or equal to 200,000 grams/mol (g/mol); and
wherein the thermoplastic composition, when disposed over a circumference of a conductor having a cross section of 2.0 square millimeters to form a covering having a thickness of 400 micrometers, has a long term chemical resistance to gasoline of greater than or equal to 100 days.

19. A method of improving long term chemical resistance to gasoline for a covered conductor comprising:
disposing a covering over a conductor;
wherein the covering comprises a thermoplastic composition;
wherein the thermoplastic composition comprises
   (i) a poly(arylene ether);
   (ii) a flame retardant
   (iii) polypropylene, high density polyethylene, or combination thereof; and
   (iv) a block copolymer comprising a first block and a second block;
   wherein the first block comprises repeating aryl alkylene units and the second block comprises repeating alkylene units;
   wherein the block copolymer has a weight average molecular weight of greater than or equal to 200,000 grams/mol (g/mol).

20. A method of improving long term chemical resistance to gasoline for a covered conductor comprising:
disposing a covering over a circumference of a conductor;
wherein the covering comprises a thermoplastic composition;
wherein the thermoplastic composition comprises
   (i) a poly(arylene ether);
   (ii) a flame retardant;
   (iii) high density polyethylene; and
   (iv) a block copolymer comprising a first block and a second block;
   wherein the first block comprises repeating aryl alkylene units and the second block comprises repeating alkylene units, and
   wherein the composition has a weight ratio of high density polyethylene to poly(arylene ether) of greater than or equal to 0.50.

21. A method of testing for long term chemical resistance to gasoline comprising:
- a.) testing a coated conductor for chemical resistance according to ISO 6722 using ISO 1817 liquid C;
- b.) aging the coated conductor at 23° C. and 50% relative humidity with no externally applied stress; and
- c.) inspecting the coated conductor daily for a crack;

wherein a.) through c.) are performed in the order given.

22. The method of claim 21, wherein aging occurs in a closed container and the closed container is stored at 23° C. and 50% relative humidity.

23. The method of claim 22, wherein the closed container comprises a polyethylene bag.

24. The method of claim 21, wherein inspecting for a crack comprises unaided visual inspection.

25. The method of claim 21, wherein inspecting for a crack comprises performing a modified withstand voltage test according to ISO 6722 section 6.2 wherein the modifications comprise immersing the sample in a solution comprising 3% sodium chloride by weight for 10 to 60 minutes and applying 1 kilovolt for 1 minute.

* * * * *